(12) United States Patent
Bende

(10) Patent No.: US 11,024,915 B2
(45) Date of Patent: *Jun. 1, 2021

(54) BATTERY MODULE ADAPTER

(71) Applicant: Miklos Bende, Oak Brook, FL (US)

(72) Inventor: Miklos Bende, Oak Brook, FL (US)

( * ) Notice: Subject to any disclaimer, the term of this patent is extended or adjusted under 35 U.S.C. 154(b) by 137 days.

This patent is subject to a terminal disclaimer.

(21) Appl. No.: 16/219,585

(22) Filed: Dec. 13, 2018

(65) Prior Publication Data

US 2020/0014004 A1 Jan. 9, 2020

Related U.S. Application Data

(63) Continuation-in-part of application No. 16/042,625, filed on Jul. 23, 2018, and a continuation-in-part of application No. 16/027,832, filed on Jul. 5, 2018.

(51) Int. Cl.
| | |
|---|---|
| *H01M 2/10* | (2006.01) |
| *H01M 2/20* | (2006.01) |
| *H01M 2/30* | (2006.01) |
| *H01M 10/48* | (2006.01) |
| *H01M 50/20* | (2021.01) |
| *H01M 50/502* | (2021.01) |
| *H01M 50/543* | (2021.01) |

(52) U.S. Cl.
CPC ......... *H01M 50/20* (2021.01); *H01M 10/482* (2013.01); *H01M 50/502* (2021.01); *H01M 50/543* (2021.01); *H01M 2220/20* (2013.01)

(58) Field of Classification Search
CPC .. H01M 2/1077; H01M 2/206; H01M 10/482; H01M 2/30
See application file for complete search history.

(56) References Cited

U.S. PATENT DOCUMENTS

| | | | |
|---|---|---|---|
| 2,707,721 A | | 5/1955 | Anderson et al. |
| 4,255,502 A | * | 3/1981 | Taylor, III .............. H01M 2/10 |
| | | | 429/120 |
| 4,885,524 A | | 12/1989 | Wilburn |
| 5,162,164 A | * | 11/1992 | Dougherty .......... H01M 2/0242 |
| | | | 429/150 |
| 5,939,960 A | | 8/1999 | Godel et al. |
| 7,573,229 B2 | | 8/2009 | Arakelian |
| 8,514,039 B1 | | 8/2013 | Yamane et al. |
| 9,525,195 B2 | | 12/2016 | Wyatt et al. |
| 2008/0118819 A1 | | 5/2008 | Gamboa |

(Continued)

FOREIGN PATENT DOCUMENTS

WO WO 2016/205386 12/2016

OTHER PUBLICATIONS

Search Report & Written Opinion issued in Int'l App. No. PCT/US2019/036965.

(Continued)

*Primary Examiner* — Miriam Stagg
*Assistant Examiner* — Rachel L Zhang
(74) *Attorney, Agent, or Firm* — Barnes & Thornburg LLP

(57) ABSTRACT

A battery module adapter for a vehicle or other equipment including at least one battery module and a housing assembly having a pair of battery terminals and a metal receiver functioning as an electrical connector defining a receptacle for receiving the battery module. The exterior dimensions of the housing assembly may be the same as the exterior dimensions of a standard battery.

30 Claims, 8 Drawing Sheets

(56) References Cited

U.S. PATENT DOCUMENTS

| | | |
|---|---|---|
| 2011/0189533 A1 | 8/2011 | Reis et al. |
| 2014/0295250 A1* | 10/2014 | Nishikawa .......... H01M 2/1061 |
| | | 429/156 |
| 2015/0037616 A1 | 2/2015 | Wyatt et al. |
| 2015/0037640 A1 | 2/2015 | Pinon et al. |
| 2015/0318521 A1 | 11/2015 | Zeiler et al. |
| 2016/0006087 A1 | 1/2016 | Lee |
| 2016/0093845 A1 | 3/2016 | Dekeuster et al. |
| 2016/0093848 A1 | 3/2016 | Dekeuster et al. |
| 2016/0093852 A1 | 3/2016 | Dekeuster et al. |
| 2016/0093854 A1 | 3/2016 | Tyler et al. |
| 2016/0197332 A1 | 7/2016 | Lee |
| 2016/0380252 A1 | 12/2016 | Rhein |
| 2017/0146611 A1 | 5/2017 | Yonan |
| 2018/0053926 A1 | 2/2018 | Shaffer, II et al. |
| 2020/0014003 A1* | 1/2020 | Bende ................. H01M 2/1072 |

OTHER PUBLICATIONS

U.S. Appl. No. 16/027,832, filed Jul. 5, 2018
U.S. Appl. No. 16/042,625, filed Jul. 23, 2018

* cited by examiner

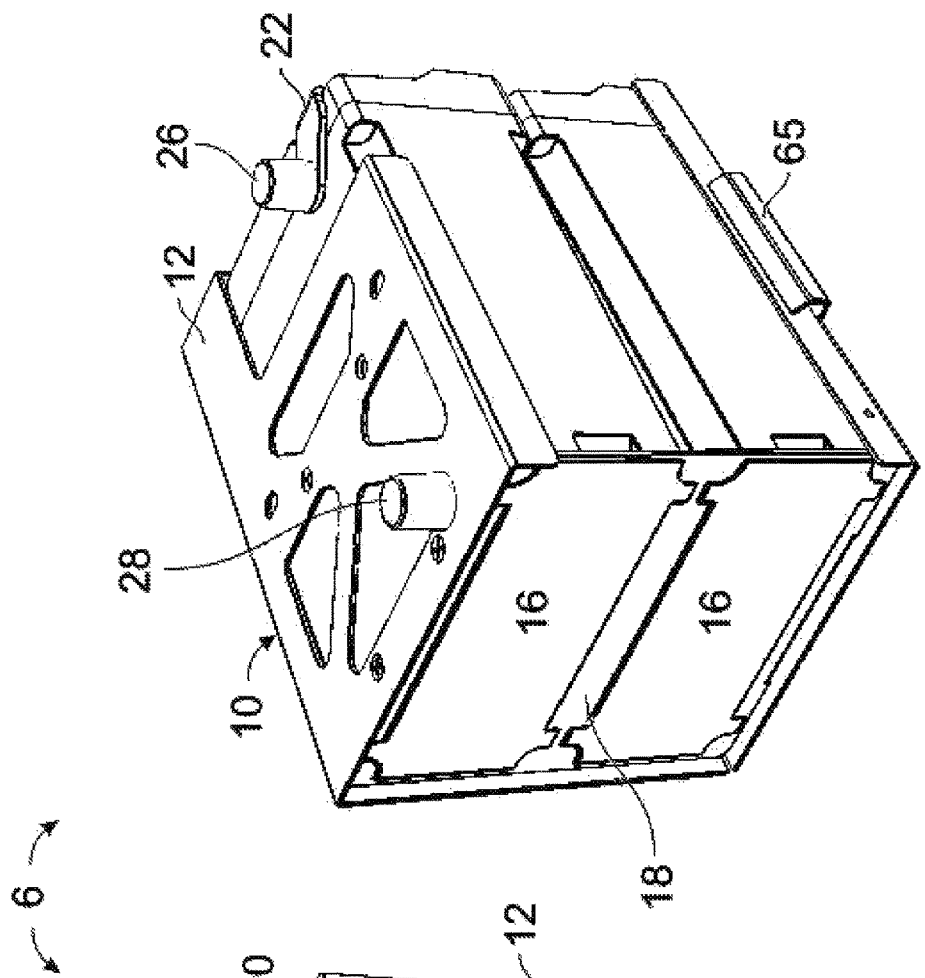
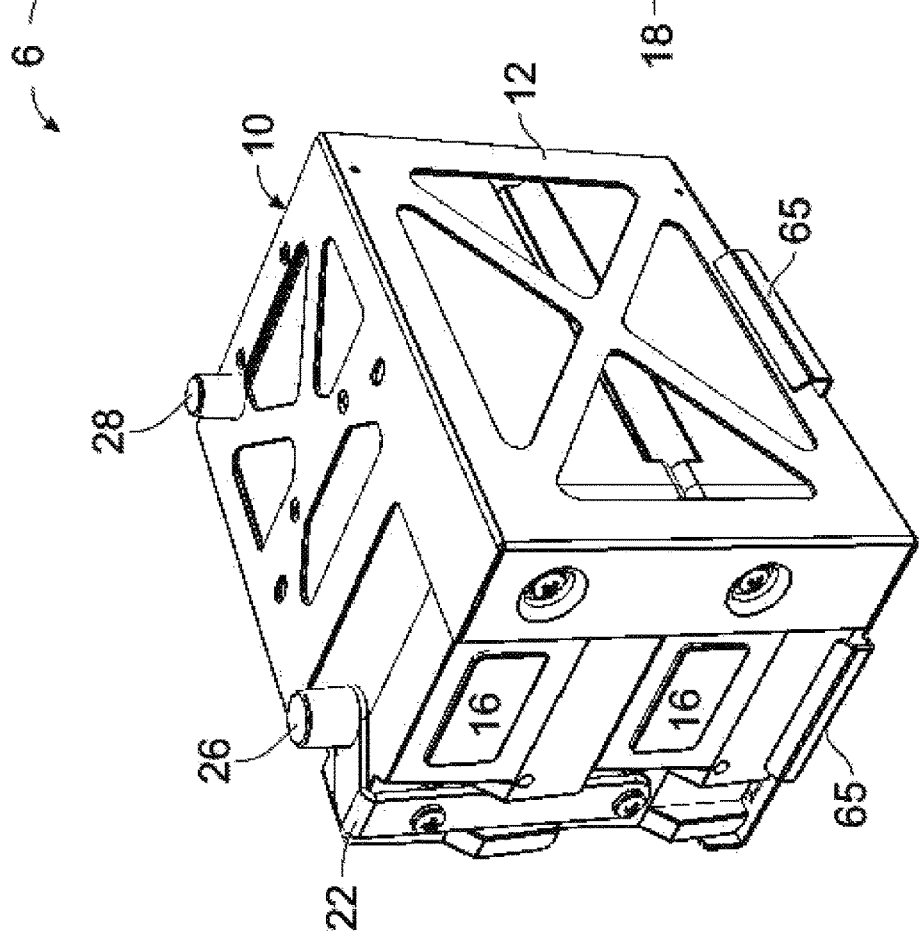
FIG. 1(b)
FIG. 1(a)

BATTERY MODULE ADAPTER

This application is a Continuation-in-Part of copending U.S. application Ser. No. 16/027,832, filed Jul. 5, 2018, and U.S. application Ser. No. 16/042,625, filed Jul. 23, 2018, the contents of which are incorporated herein by reference in their entirety.

The present disclosure relates to a battery module adapter for a vehicle or other equipment.

BACKGROUND

Automobiles and other vehicles and equipment typically are designed with a certain standard battery size in mind. During the design, the clearances around and above the battery, the battery tray, the method of securing the battery, the positive and negative lead lengths typically are all predetermined based on such certain standard battery size. As a result, battery modules that do not have such standard battery size typically cannot be used with such equipment.

SUMMARY

The present disclosure relates to a battery module adapter for a battery of a vehicle or other equipment having a first positive battery terminal and a first negative battery terminal and a distance therebetween. The battery module adapter comprises a housing assembly that includes a second positive battery terminal and a second negative battery terminal having a distance therebetween. The distance between the second positive battery terminal and the second negative battery terminal is greater than the distance between the first positive battery terminal and the first negative battery terminal. The housing assembly further includes a first electrical connector interconnecting the first positive battery terminal and the second positive battery terminal, and a second electrical connector interconnecting the first negative battery terminal and the second negative battery terminal. One of the first electrical connector and the second electrical connector comprises a metal receiver defining a receptacle for receiving the battery module. The other of the first electrical connector and the second electrical connector may comprise any other suitable electrical connector.

The metal receiver may include a metal extension for adjusting the length of the metal receiver. For example, the metal receiver may include a base and a metal extension slidably engageable with each other and lockable to each other at a desired position for adjusting the length of the metal receiver. The battery module adapter may further include a partition receivable in the receptacle for holding the battery module in place within the receptacle and one or more hold down structures.

The exterior dimensions, length, width and height of the housing assembly when assembled may be the same or nearly the same as the exterior dimensions of a standard battery.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

BRIEF DESCRIPTION OF THE DRAWINGS

FIG. 1(a) is a perspective view of a battery module adapter in accordance with an embodiment of the present disclosure illustrating the battery modules contained in the housing assembly;

FIG. 1(b) is another perspective view of the battery module adapter of FIG. 1(a) illustrating the battery modules contained in the housing assembly;

DETAILED DESCRIPTION

FIGS. 1-8 illustrate embodiments of a battery module adapter 6 and 106 including a housing assembly 10 and 110, respectively, for one or more battery modules 16 and 116, respectively. Each housing assembly 10 and 110 includes at least one battery module 16 and 116, respectively, for installation of the battery module in a vehicle or other equipment designed to employ a specific battery size even though the battery module to be installed is sized differently from the specific battery size intended for the vehicle or other equipment.

Figure 2:
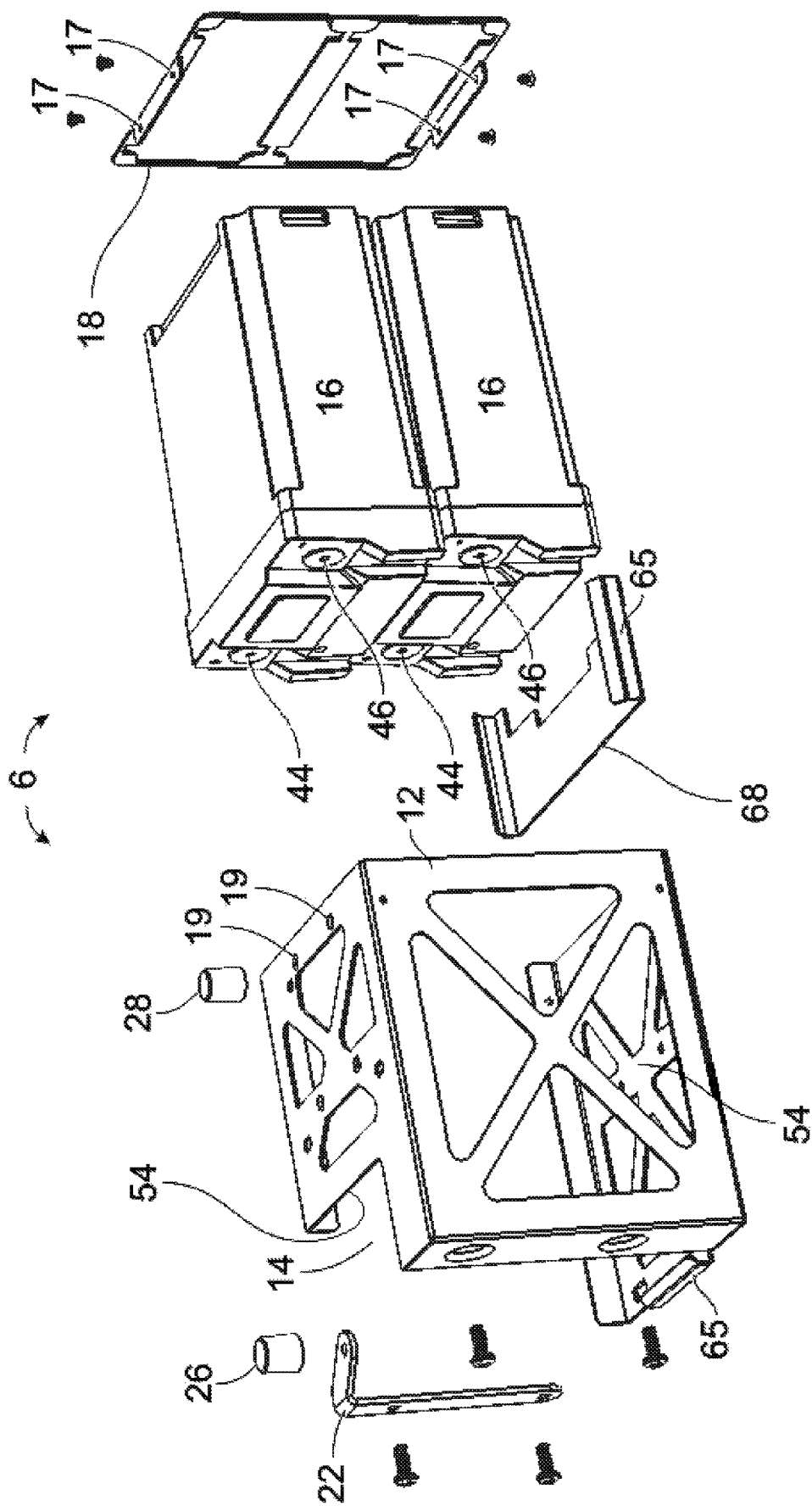
FIG. 2 is an exploded view of the battery module adapter of FIGS. 1(a) and (b) also illustrating the battery modules contained in the housing assembly.
Figure 3:
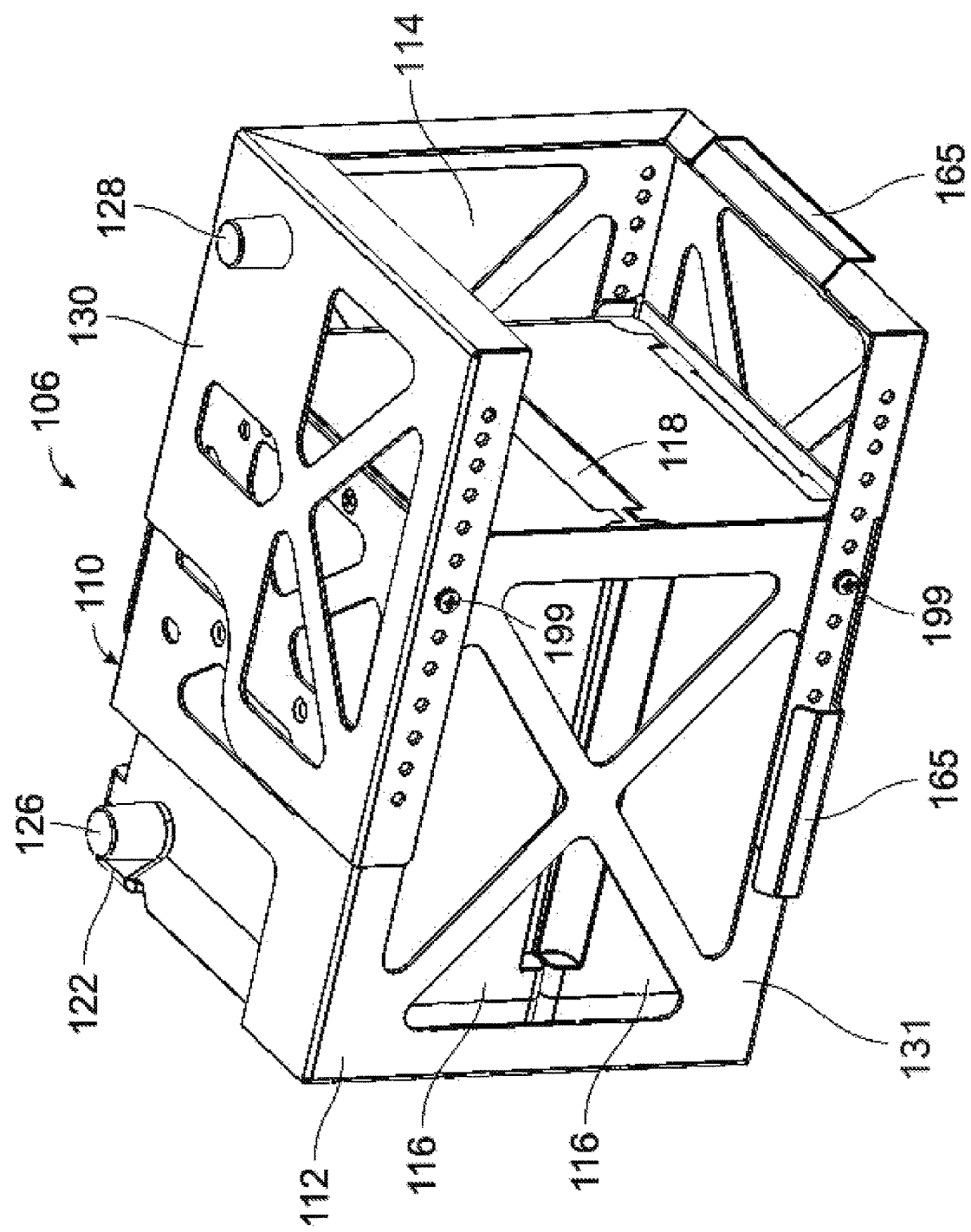
FIG. 3 is a perspective view of a battery module adapter in accordance with another embodiment of the present disclosure illustrating the battery modules contained in the housing assembly.
Figure 4:
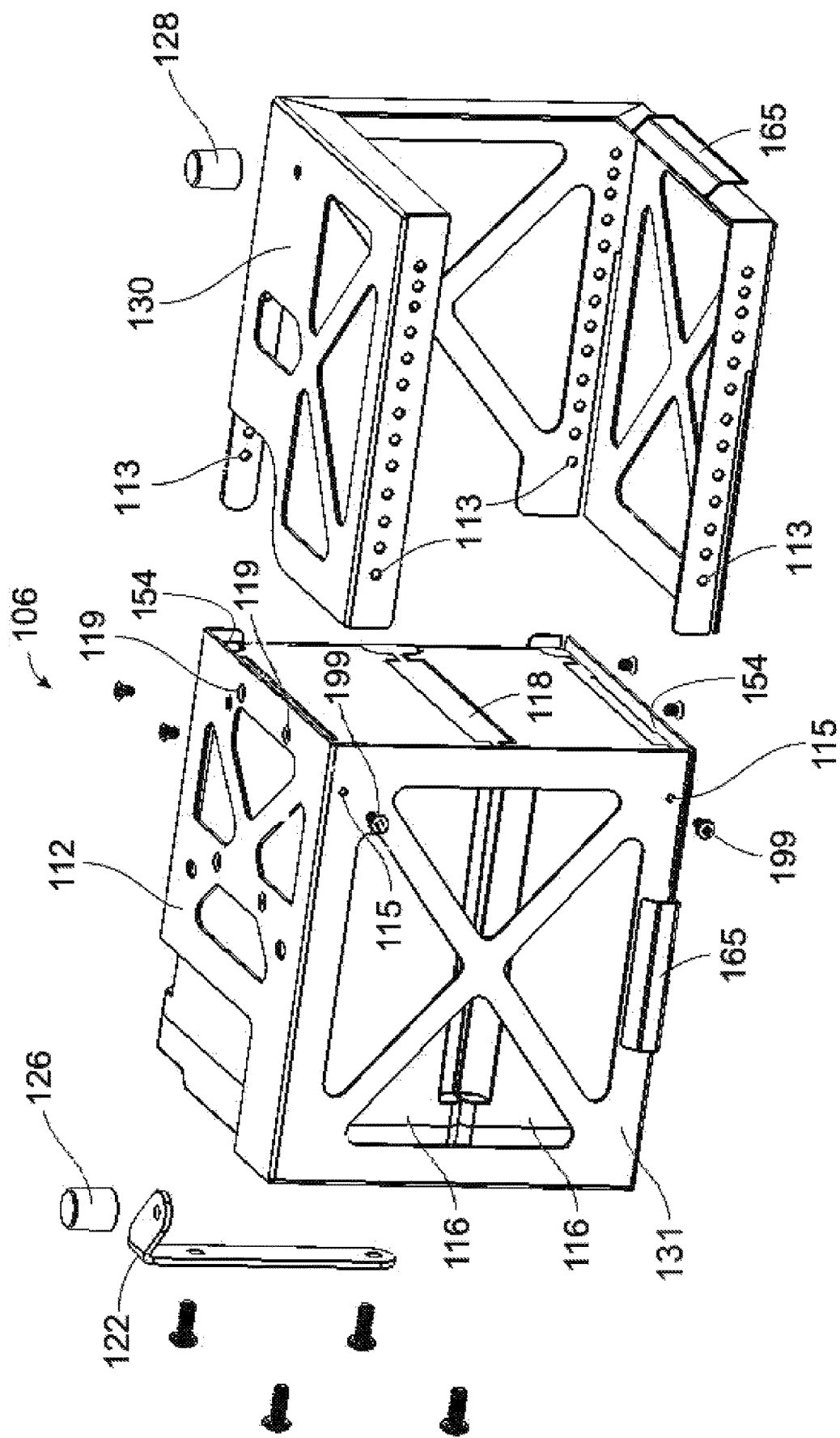
FIG. 4 is an exploded view of the battery module adapter of FIG. 3 also illustrating the battery modules contained in the housing assembly.
Figure 5:
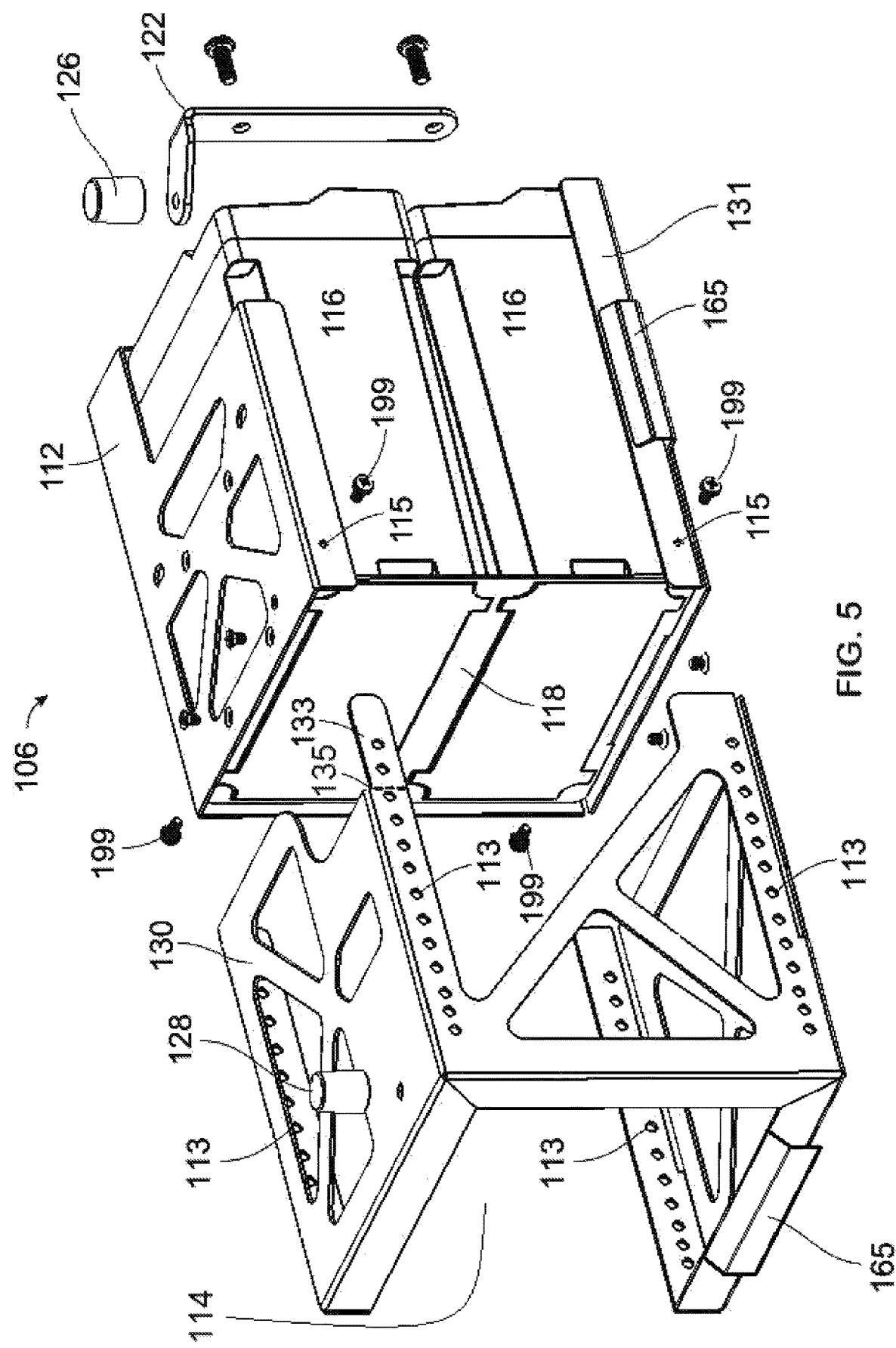
FIG. 5 is another exploded view of the battery module adapter of FIG. 3.
Figure 6:
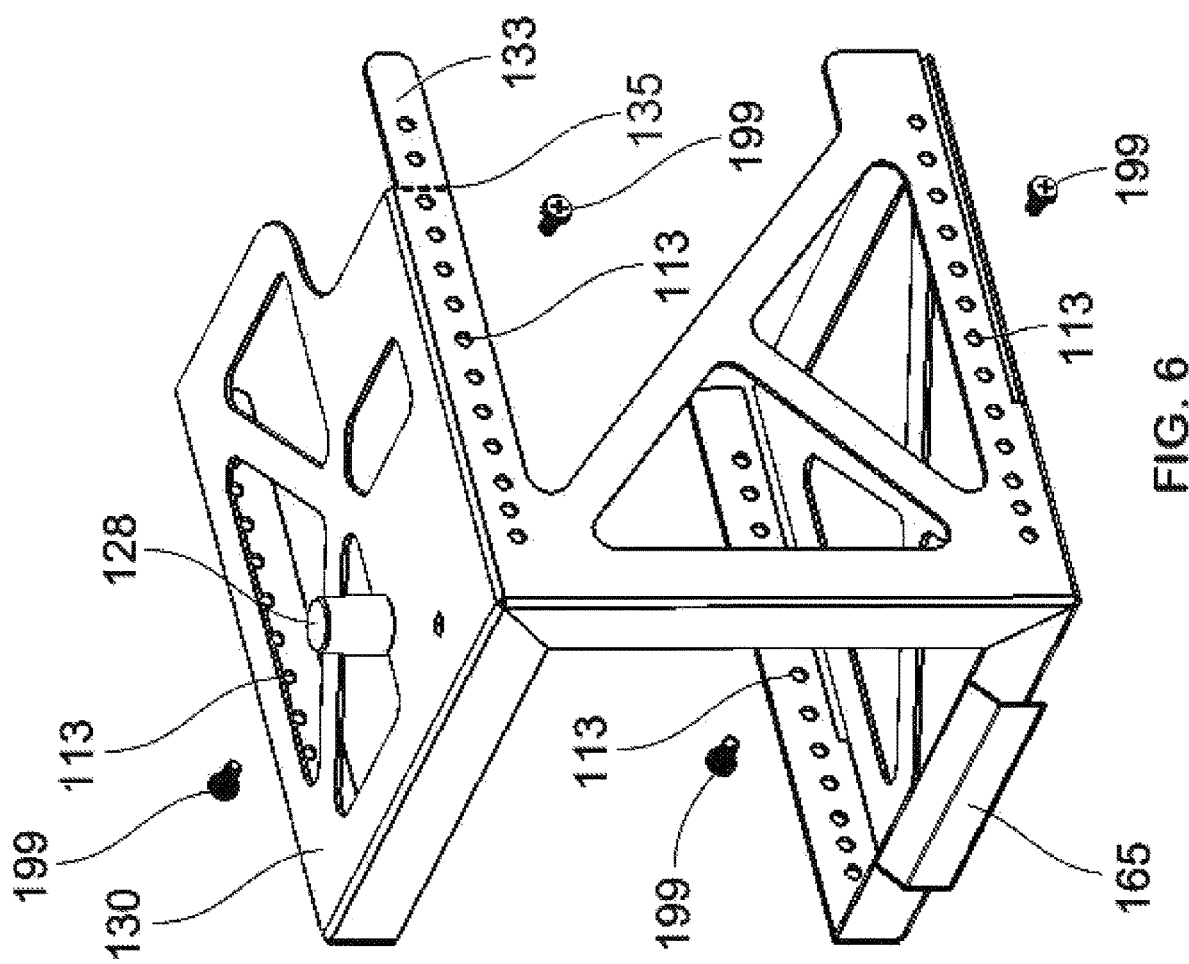
FIG. 6 is a perspective view of the extension and the negative battery terminal of the battery module adapter of FIG. 3.

With reference to FIGS. 1-2, the housing assembly 10 includes a metal receiver 12 that defines a receptacle 14 receiving a pair of battery modules 16, one or more partitions 18, a first electrical connector in the form of a positive terminal busbar 22, a positive battery terminal 26 and a negative battery terminal 28. The battery modules 16 may be of any suitable size configured to be received within the receptacle 14 and may instead be a single battery module or multiple battery modules. Each battery module 16 includes a positive battery terminal 44 and a negative battery terminal 46. Where there are two battery modules 16, the battery modules may be connected to each other in parallel as illustrated on FIG. 1(a) or (b) or in series and, where there are three or more battery modules, the battery modules may be connected to each other in parallel or series or a combination of both.

The positive terminal busbar 22 interconnects the positive battery terminal 44 of at least one of the battery modules 16 with the positive battery terminal 26 of the housing assembly 10. The positive battery terminal busbar 22 is connected and secured to at least one of the positive battery terminals 44 of the battery modules 16 by a screw or by any other suitable joining method. The positive terminal 26 is connected and secured to the positive terminal busbar 22 by a screw or by any other suitable joining method. The positive terminal busbar 22 instead may be any other suitable electrical connector such as a terminal cable, a bar or other suitable connector or combination of any of the foregoing and may have any other suitable configuration. The positive battery terminal 26 shown as a post may have any other suitable configuration.

The metal receiver 12 functions as an electrical connector that interconnects the negative battery terminal 46 of at least one of the battery modules 16 with the negative battery terminal 28 of the housing assembly 10. The metal receiver 12 is connected and secured to at least one of the negative battery terminals 46 of the battery module 16 by a screw or by any other suitable joining method. The negative battery terminal 28 is connected and secured to the metal receiver 12 by a screw or by any other suitable joining method. The metal receiver 12 is constructed of metal with electric current carrying capacity and may have any other suitable configuration. The metal receiver 12 may also be constructed of any non-metal material that includes steel or other metal and that has electric current carrying capacity. The metal receiver 12 may have any other suitable configuration in accordance with other embodiments of the present disclosure. The negative terminal 28 shown as a post may have any other suitable configuration.

The partition 18 is received by the receptacle 14 and is positioned next to the battery modules 16 to limit or eliminate movement of the battery modules within the receptacle or for otherwise holding the battery modules in place. The illustrated partition 18 is in the form of a metal frame with side rails, top and bottom rails, a rail interconnecting the side rails and top and bottom brackets at right angle to the frame. The top and bottom brackets, each, incorporate two tapped holes 15. The partition 18 may have any other configuration that complements the sides of the battery modules 16. The metal receiver 12 includes a pair of opposed walls 54 with two holes each 19 positioned to engage the partition 18 with securing screws. The location of the holes 19 depends upon the sizes of the battery modules 16 received within the receptacle 14. The opposed walls 54 may incorporate multiple hole groups to provide alternative locations for the partition 18.

The metal receiver 12 incorporates one or more hold-down structures 65. A pair of opposed hold down structures 65 may be interconnected by a removable bracket 68. The metal receiver 12 may be secured to the vehicle by employing the hold down structures or by in any other suitable manner in accordance with other embodiments of the present disclosure. The partition 18 and the bracket 68 incorporating the side hold-down structures 65 may be constructed of metal, plastic or any other suitable material and may have any suitable configuration.

The distance between the positive battery terminal 26 and the negative battery terminal 28 of the housing assembly 10 depends upon the vehicle and the size of the battery the vehicle was designed to accommodate. For example, the distance between positive and negative battery terminals of a standard 8.2" battery is about 6". For example, if the vehicle was intended for use with such a standard 8.2" battery, the distance between the positive and negative battery terminals of the housing assembly would be about 6". The housing assembly 10 can be used with battery modules 16 having a distance between the positive and negative terminals 44 and 46 that is less than the distance between the positive battery terminal 26 and the negative battery terminal 28 of the housing assembly. By turning the battery modules 180° in the receptacle, the polarity of terminals 26 and 28 in the housing assembly 10 may be reversed.

With reference to FIGS. 3-6, a housing assembly 110 in accordance with another embodiment of the present disclosure includes a metal receiver 112 that defines a receptacle 114 receiving a pair of battery modules 116, one or more partitions 118, electrical connector in the form of a positive terminal busbar 122, a positive battery terminal 126 and a negative battery terminal 128. The metal receiver 112 interconnects the negative battery terminal 128 and the negative battery terminals of the battery modules 116. The metal receiver 112 includes a first component in the form of a metal extension 130 and a base component 131 slidably engageable with the metal extension 130.

The battery modules 116 may be of any suitable size configured to be received within the receptacle and may instead be a single battery module or multiple battery modules. Each battery module 116 includes a positive battery terminal and a negative battery terminal. Where there are two battery modules 116, the battery modules may be connected to each other in parallel or in series and, where there are three or more battery modules, the battery modules may be connected to each other in parallel or series or a combination of both.

The positive terminal busbar 122 interconnects the positive battery terminal of at least one of the battery modules 116 with the positive battery terminal 126 of the housing assembly 110. The positive terminal busbar 122 is connected and secured to at least one of the positive battery terminals of the battery modules 116 by a screw or by any other suitable joining method. The positive terminal 126 is connected and secured to the positive terminal busbar 122 by a screw or by any other suitable joining method. The positive terminal busbar 122 instead may be any other suitable electrical connector such as a cable, a bar or other suitable connector or combination of any of the foregoing and may have any other suitable configuration. The positive battery terminal 126 shown as a post may have any other suitable configuration.

The metal receiver 112, including the metal extension 130, functions as an electrical connector that interconnects the negative battery terminal of at least one of the battery modules 116 with the negative battery terminal 128. The metal extension 130 and the base component 131 are secured to each other by four screws 199. The metal receiver 112 is connected and secured to at least one of the negative battery terminals of the battery module 116 by a screw or by any other suitable joining method. The negative battery terminal 128 is connected and secured to the metal extension 130 by a screw or by any other suitable joining method. The metal receiver 112, including the extension 130, is constructed of metal with electric current carrying capacity and may have any other suitable configuration. The metal receiver, including the extension, may also be constructed of any non-metal material that includes steel or other metal and that has electric current carrying capacity. The metal receiver 112 may have any other suitable configuration in accordance with other embodiments of the present disclosure. The negative terminal 128 shown as a post may have any other suitable configuration.

The partition 118 is received by the receptacle and is positioned next to the battery modules 116 to limit or eliminate movement of the battery modules within the receptacle or for otherwise holding the battery modules in place. The illustrated partition 118 is in the form of a metal frame with side rails, top and bottom rails, a rail interconnecting the side rails and top and bottom brackets at right angle to the frame. The top and bottom brackets, each, incorporate two tapped holes. The partition 118 may have any other configuration that complements the sides of the battery modules 116. The metal receiver 112 includes a pair of opposed walls 154 with two holes each 119 positioned to engage the partition 118 with securing screws. The location of the holes 119 depends upon the sizes of the battery modules 116 received within the receptacle. The opposed walls 154 may incorporate multiple hole groups to provide alternative locations for the partition 118.

The metal extension 130 is slidingly engaged with the base component 131 and may be secured to each other in any suitable manner to achieve a desired length of the metal receiver 112. In the illustrated embodiment, for example, the base component 131 incorporates four tapped holes 115. The metal extension 130 incorporates hole groupings 113, for example, which allow the extension to be adjusted to a specific overall length. The metal extension 130 is secured to the base component 131 by four screws 199. In the illustrated example, there are multiple hole groupings that allow for overall lengths, for example, of 8.2", 9", 11" and 14". Tab 133 is designed to be broken off along the weakened line 135 when the extension 130 is configured in 9" or less overall length. In these positions the negatively charged tab 133 is deemed to be too close to the positively charged battery terminal 126. The metal extension 130 and the base component 131 may be secured together at the desired position in any other manner in accordance with other embodiments of the present disclosure.

The metal receiver 112 may incorporate one or more hold down structures 165. The metal receiver 112, including the extension 130, may be secured to the vehicle by employing the hold down structures or in any other suitable manner. The partition 118 and hold-down structures 165 may be constructed of metal, plastic or any other suitable material and may have any suitable configuration.

The distance between the positive battery terminal 126 and negative battery terminal 128 of the housing assembly 110 depends upon the vehicle and the size of the battery the vehicle was designed to accommodate. For example, the distance between positive and negative battery terminals of a standard 11" battery is about 8.5". For example, if the vehicle was intended for use with such a standard 11" battery, the distance between the positive and negative battery terminals 126 and 128 of the housing assembly 110 would be about 8.5". Since the metal extension 130 incorporating multiple hole groupings is slidingly engaged with the metal receiver 112, standard overall battery lengths of 8.2", 9", 11" and 14", for example, may be configured resulting in standard terminal distances of approximately 6", 7", 8.5" and 11.5". The housing assembly 110 can be used with battery modules 116 having a distance between the positive and negative terminals of the battery modules that is less than the distance between the positive battery terminal 126 and the negative battery terminal 128 of the housing assembly. By turning the battery modules 180° in the receptacle, the polarity of terminals 126 and 128 in the housing assembly 110 may be reversed.

Figure 7:
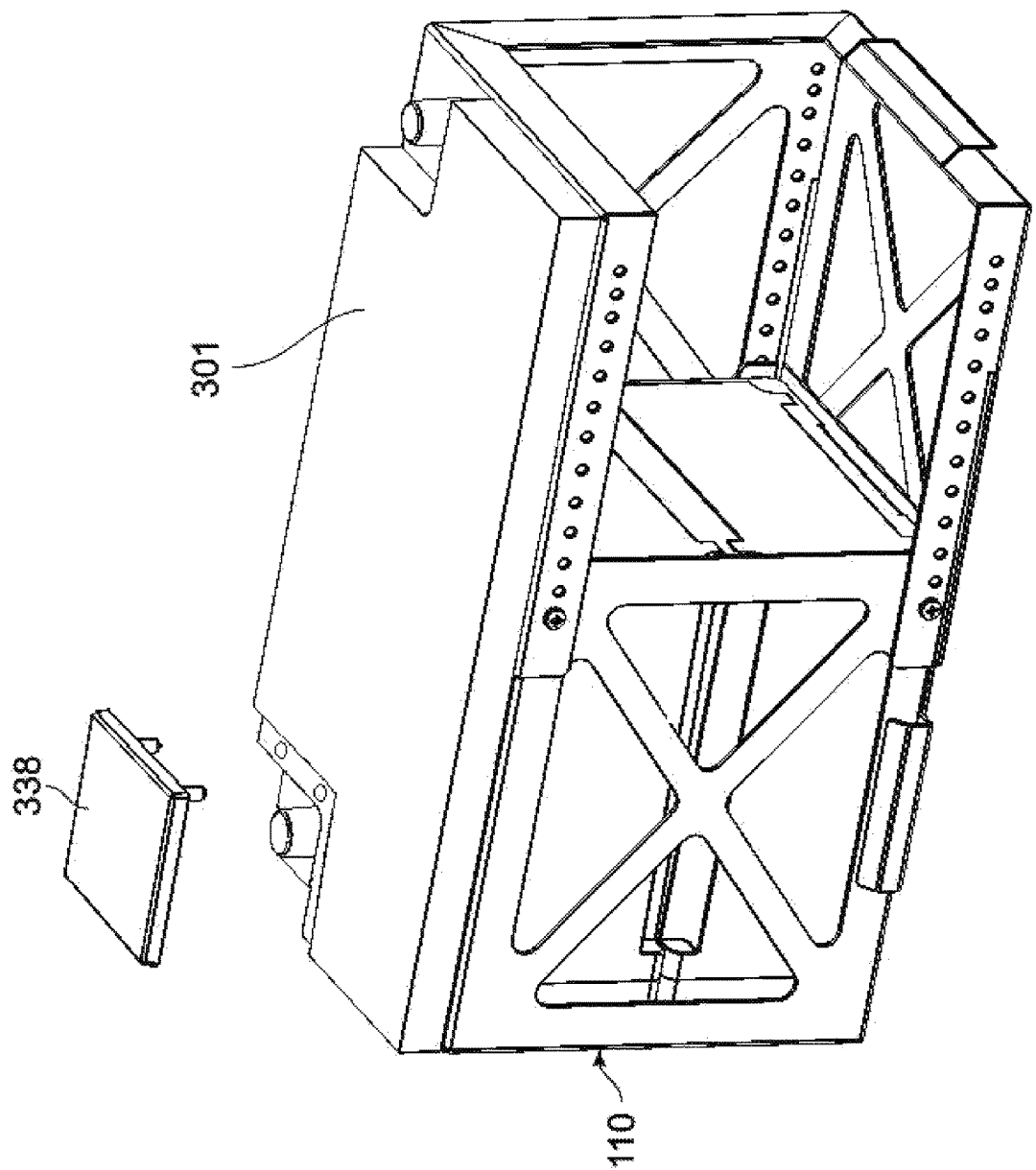
FIG. 7 is a perspective view of a battery module adapter illustrating a rigid pad attached to the top of the housing assembly.

With reference to FIG. 7, a rigid pad 301 may be attached to the top of the housing assembly 10 and 110. The pad 301 may also include a battery terminal lid 338 to cover the positive battery terminal. The combined height of the housing assembly and the thickness of the rigid pad 301 serves as a load bearing structure in some vehicle applications. The rigid pad 301 and the terminal lid 338 may be of any suitable material. The rigid pad 301 may be attached to the housing assembly by any suitable means.

Figure 8:
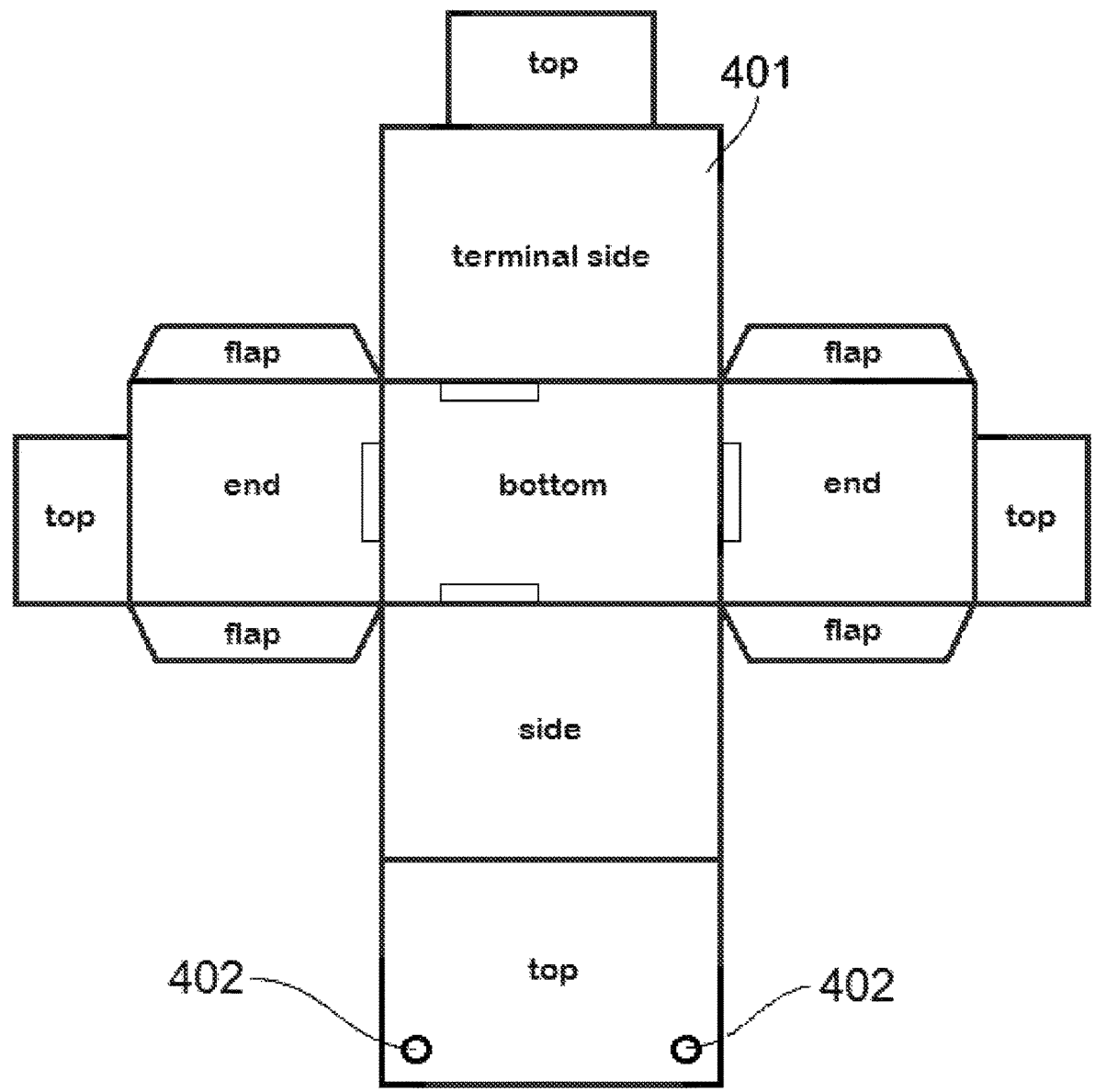
FIG. 8 is a pattern of a fold together insulating jacket fitted over the housing assembly of the battery module adapter that allows only the positive and negative terminals to be exposed.

With reference to FIG. 8, the battery module adapter may also include a fold together insulating jacket 401 made out of thin non-conductive material for fully isolating the battery module adapter from the surroundings while exposing the positive and negative terminals of the housing assembly. The fold together insulating jacket 401 is comprised of thin non-conductive material. The fold together insulating jacket 401 is foldable to substantially enclose the housing assembly, and includes a pair of apertures 402 for receiving and exposing the positive and negative terminals of the housing assembly to facilitate access thereto. The insulating jacket 401 may have any other suitable configuration. The insulation of the battery module adapter may be achieved by any other suitable means.

The present disclosure provides many benefits. For example, vehicles are typically designed to accommodate specific size batteries (e.g., 8.2", 9", 11" or 14") and therefore the size of batteries to be installed on such vehicles is typically limited to the specific size. The battery module adapter 6 or 106 comprising housing assembly 10 or 110 of the present disclosure, however, enables smaller batteries (battery modules) to be used on such vehicles. The present disclosure, among other things, provides an efficient manner for using odd size batteries (battery modules) on vehicles designed to use a specific standard battery size. References to standard battery size herein are intended to refer to the size and dimensions of a commercially used battery as understood by one of ordinary skill in the art. For example, such references are intended to include battery sizes standardized by agreement by two or more battery manufacturers or battery sizes of any other vehicle batteries having predetermined sizes and dimensions. Similarly, one of ordinary skill in the art understands that references to "battery module" herein are intended to refer to a single battery cell or to an assembly of battery cells configured in series, parallel or a combination of both. The battery cell or the assembly of battery cells comprising the battery module may or may not have a full or partial housing or enclosure.

The present disclosure also provides ease of manufacture benefits because, among other reasons, the components are versatile, few in number and constructed in whole or in part of sheet metal. The receiver constructed of sheet metal merely requires forming without the need for special tooling.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A battery module adapter for a battery of a vehicle comprising at least one battery module having a first positive battery terminal and a first negative battery terminal and a distance therebetween, the battery module adapter comprising:

a housing assembly including:
  a second positive battery terminal and a second negative battery terminal having a distance therebetween, the distance between the second positive battery terminal and the second negative battery terminal is greater than the distance between the first positive battery terminal and the first negative battery terminal;
  a first electrical connector electrically interconnecting the first positive battery terminal and the second positive battery terminal; and
  a second electrical connector electrically interconnecting the first negative battery terminal and the second negative battery terminal;
  wherein one of the first electrical connector and the second electrical connector comprises a metal receiver defining a receptacle for receiving the battery module and the other of the first electrical connector and the second electrical does not comprise a metal receiver defining a receptacle for receiving the battery module.

2. The battery module adapter of claim 1 wherein the other of the first electrical connector and the second electrical connector comprises a busbar.

3. The battery module adapter of claim 1 wherein the other of the first electrical connector and the second electrical connector comprises a terminal cable.

4. The battery module adapter of claim 1 wherein the metal receiver interconnects the first negative battery terminal and the second negative battery terminal.

5. The battery module adapter of claim 1 wherein the metal receiver interconnects the first positive battery terminal and the second positive battery terminal.

6. A battery module adapter for a battery of a vehicle comprising at least one battery module having a first positive battery terminal and a first negative battery terminal and a distance therebetween, the battery module adapter comprising:
  a housing assembly including:
    a second positive battery terminal and a second negative battery terminal having a distance therebetween, the distance between the second positive battery terminal and the second negative battery terminal is greater than the distance between the first positive battery terminal and the first negative battery terminal;
    a first electrical connector interconnecting the first positive battery terminal and the second positive battery terminal; and
    a second electrical connector interconnecting the first negative battery terminal and the second negative battery terminal;
    wherein one of the first electrical connector and the second electrical connector comprises a metal receiver defining a receptacle for receiving the battery module;
    wherein the metal receiver includes a metal extension for adjusting the length of the metal receiver.

7. A battery module adapter for a battery of a vehicle comprising at least one battery module having a first positive battery terminal and a first negative battery terminal and a distance therebetween, the battery module adapter comprising:
  a housing assembly including:
    a second positive battery terminal and a second negative battery terminal having a distance therebetween, the distance between the second positive battery terminal and the second negative battery terminal is greater than the distance between the first positive battery terminal and the first negative battery terminal;
    a first electrical connector interconnecting the first positive battery terminal and the second positive battery terminal; and
    a second electrical connector interconnecting the first negative battery terminal and the second negative battery terminal;
    wherein one of the first electrical connector and the second electrical connector comprises a metal receiver defining a receptacle for receiving the battery module;
    wherein the metal receiver includes a base and a metal extension for adjusting the length of the metal receiver.

8. The battery module adapter of claim 7 wherein the base and metal extension are slidably engageable with each other to adjust the length of the metal receiver.

9. The battery module adapter of claim 8 further comprising fasteners for locking the two components together to achieve a desired length of the metal receiver.

10. The battery module adapter of claim 7 wherein the extension comprises multiple hole groupings to achieve a desired length of the metal receiver.

11. The battery module adapter of claim 1 further comprising a partition receivable in the receptacle for holding the battery module in place within the receptacle.

12. The battery module adapter of claim 1 further comprising at least one hold-down structure.

13. The battery module adapter of claim 1 wherein the distance between the second positive battery terminal and the second negative battery terminal is substantially the same as the distance between a positive battery terminal and a negative battery terminal of a standard battery.

14. The battery module adapter of claim 1 wherein the distance between the second positive battery terminal and the second negative battery terminal is approximately 6".

15. The battery module adapter of claim 1 wherein the distance between the second positive battery terminal and the second negative battery terminal is approximately 7".

16. The battery module adapter of claim 1 wherein the distance between the second positive battery terminal and the second negative battery terminal is approximately 8.5".

17. The battery module adapter of claim 1 wherein the distance between the second positive battery terminal and the second negative battery terminal is approximately 11.5".

18. The battery module adapter of claim 1 further comprising an electrically-insulating jacket substantially enclosing the housing assembly, the insulating jacket defining a pair of apertures for receiving the second positive battery terminal and the second negative battery to allow access to the second positive battery terminal and the second negative battery.

19. The battery module adapter of claim 18 wherein the insulating jacket is foldable to substantially enclose the housing assembly.

20. A battery module adapter for a battery of a vehicle having at least one battery module having a first positive battery terminal and a first negative battery terminal and a distance therebetween the battery module adapter comprising:
  a housing assembly comprising:
    a second positive battery terminal and a second negative battery terminal having a distance therebetween, the distance between the second positive battery terminal and the second negative battery terminal is greater than the distance between the first positive battery terminal and the first negative battery terminal;
    an electrical connector comprising a metal receiver defining a receptacle for receiving the battery module, the metal receiver electrically interconnecting the first negative battery terminal and the second negative battery terminal; and an electrical connector electrically interconnecting the first positive battery terminal and the second positive battery terminal, not being electrically interconnected to the metal receiver and not comprising a metal receiver defining a receptacle for receiving the battery module.

21. A battery module adapter for a battery of a vehicle having at least one battery module having a first positive battery terminal and a first negative battery terminal and a distance therebetween the battery module adapter comprising:

a housing assembly comprising:

a second positive battery terminal and a second negative battery terminal having a distance therebetween, the distance between the second positive battery terminal and the second negative battery terminal is greater than the distance between the first positive battery terminal and the first negative battery terminal;

an electrical connector comprising a metal receiver defining a receptacle for receiving the battery module, the metal receiver interconnecting the first negative battery terminal and the second negative battery terminal; and an electrical connector interconnecting the first positive battery terminal and the second positive battery terminal;

wherein the metal receiver includes a metal extension for adjusting the length of the metal receiver.

22. A battery module adapter for a battery of a vehicle having at least one battery module having a first positive battery terminal and a first negative battery terminal and a distance therebetween the battery module adapter comprising:

a housing assembly comprising:

a second positive battery terminal and a second negative battery terminal having a distance therebetween, the distance between the second positive battery terminal and the second negative battery terminal is greater than the distance between the first positive battery terminal and the first negative battery terminal;

an electrical connector comprising a metal receiver defining a receptacle for receiving the battery module, the metal receiver interconnecting the first negative battery terminal and the second negative battery terminal; and an electrical connector interconnecting the first positive battery terminal and the second positive battery terminal;

wherein the metal receiver includes a base and a metal extension for adjusting the length of the metal receiver.

23. The battery module adapter of claim 22 wherein the base and metal extension are slidably engageable with each other to adjust the length of the metal receiver.

24. The battery module adapter of claim 20 wherein the distance between the second positive battery terminal and the second negative battery terminal is substantially the same as the distance between a positive battery terminal and a negative battery terminal of a standard battery.

25. The battery module adapter of claim 20 further comprising an electrically-insulating jacket substantially enclosing the housing assembly, the insulating jacket defining a pair of apertures for receiving the second positive battery terminal and the second negative battery to allow access to the second positive battery terminal and the second negative battery.

26. The battery module adapter of claim 25 wherein the insulating jacket is foldable to substantially enclose the housing assembly.

27. The battery module of claim 1 wherein the metal receiver is constructed of non-metal material and metal.

28. The battery module of claim 7 wherein the metal extension is constructed of non-metal material and metal.

29. The battery module of claim 20 wherein the metal receiver is constructed of non-metal material and metal.

30. The battery module of claim 22 wherein the metal extension is constructed of non-metal material and metal.

\* \* \* \* \*